Nov. 6, 1962    C. HYMAN ETAL    3,062,202
BODY FLUID PRESSURE MEASURING DEVICE
Filed March 25, 1960
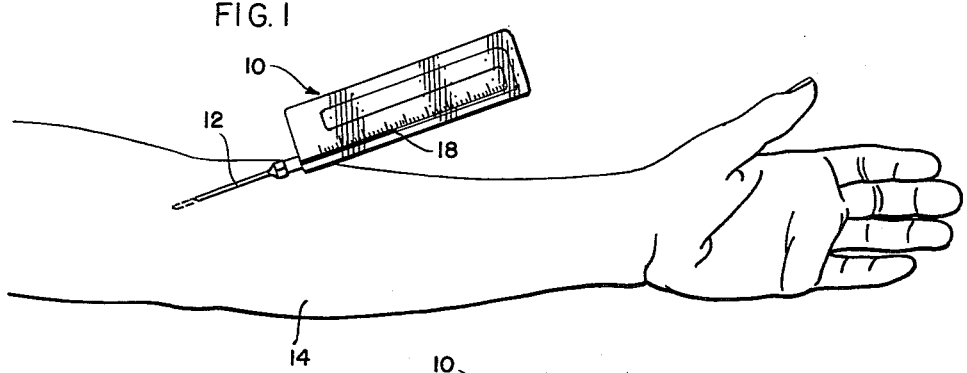
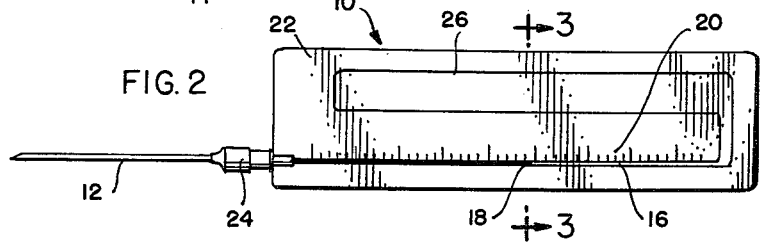
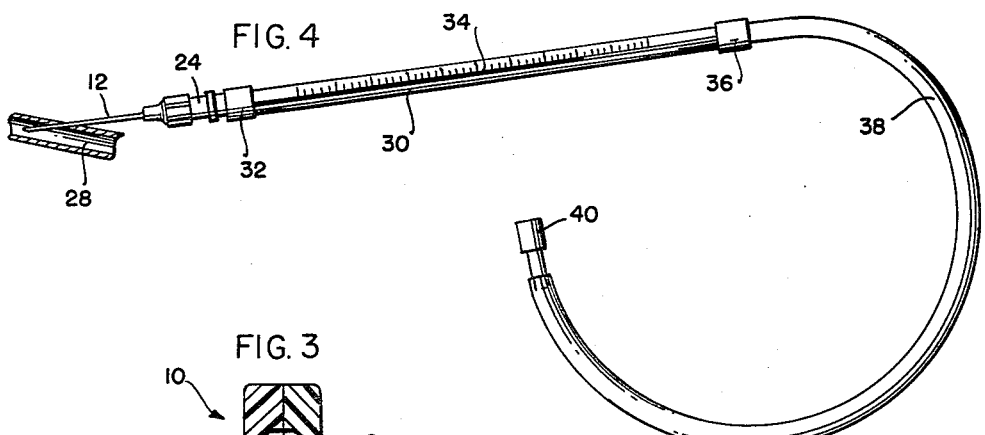
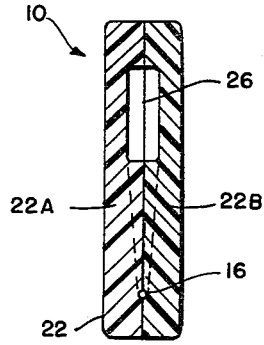
INVENTORS:
CHESTER HYMAN
TRAVIS WINSOR
BY: *Silverman, Mullin & Cass*
ATT'YS 3,062,202
Patented Nov. 6, 1962

3,062,202
BODY FLUID PRESSURE MEASURING DEVICE
Chester Hyman, 450 Orange Grove Ave., South Pasadena, Calif., and Travis Winsor, 906 S. Orange Drive, Los Angeles 36, Calif.
Filed Mar. 25, 1960, Ser. No. 17,599
8 Claims. (Cl. 128—2.05)

This invention relates generally to apparatus for the measurement of fluid pressure within the vessels or organs of humans, animals or the like and more particuIarly is concerned with the construction of a novel device which is especially suited for the measurements of fluid pressures through direct contact with the fluid.

The pressures of fluids in the vessels of all living things are indications of many facts which are of great value to those engaged in research in biology and related fields. In the case of humans, the pressure in the vascular system is measured for many reasons, including diagnosis of pathology, laboratory routine for certain ailments, the ascertainment of the progress of therapy, etc.

Indirect methods of making fluid pressure measurements exist, but these are not as accurate as any method which utilizes the particular fluid itself operating directly against some pressure sensitive device.

The direct-measuring apparatus now in use for measurement of the venous pressure of human subjects is expensive, cumbersome, complicated and difficult to operate. Such apparatus is impractical for use with most small animals and in most cases, the expense and difficulties of operation overcome any tendency for modest biology laboratories to obtain the same.

The primary object of the invention is to provide an extremely simple fluid pressure measuring device which is economical, compact, positive in action, and which is direct reading.

The achievement of the object set forth above gives rise to added advantages in the case of apparatus which is designed for the purpose of measuring the venous pressure of human subjects. Such apparatus can be made so economical that it can be disposed of following each use. The need for sterilization is eliminated because the apparatus can be sold in pre-sterilized packages, and in addition anti-coagulant solutions needed for prior devices are unnecessary.

Still a further object of the invention is to provide apparatus for the measurement of fluid pressures in humans and animals which can be used safely, quickly, and easily by laboratory technicians without any particular skill other than provided by conventional training.

Other objects of the invention are the provision of apparatus of the character described which has no moving parts; which requires no power source for operation; which utilizes no chemicals or additional apparatus or instruments; which is readily transportable.

Other objects and advantages will occur to those skilled in the art to which this invention pertains as a detailed description thereof appears hereinafter. Preferred embodiments have been set forth in considerable detail in connection with the drawing attached hereto from an examination and consideration of which it will become apparent that considerable change can be made in the physical proportions, measurements, and in the arrangement of the parts of the invention without violence to the basic concept thereof as will become evident hereinafter.

In the drawings in which the same characters of reference are used throughout the several views to designate the same parts:

FIG. 1 is a perspective view of the arm of a patient or subject showing the device of the invention being used at the ante-cubital site for ascertaining the intravenous pressure thereat.

FIG. 2 is a side elevational view of the device of the invention which is illustrated in FIG. 1.

FIG. 3 is a sectional view through the structure of FIG. 2 taken along the line 3—3 of FIG. 2 and in the indicated direction.

FIG. 4 is a side elevational view of a modified form of the invention, the apparatus being constructed utilizing parts and fittings of more or less conventional form.

As previously stated above, the invention for the first time provides economical and highly simplified apparatus for measurement of fluid pressures in humans and animals quickly and easily. Examples of such pressures include arterial and venal blood pressures, cerebral spinal fluid pressures, intra-ocular fluid pressures, pressures within the bladder and other similar vessels, salivary and other secretal gland pressures, etc. The size of the parts will of course be related to the problems being attacked and the nature of the subject and the pressures involved.

The invention is characterized by the provision of a puncturing member having a hollow bore connected with a calibrated elongate small bore passageway terminating in a closed pressure chamber. The puncturing member is inserted into the vessel whose fluid is to be measured, and the fluid passes up the puncturing member bore and into the calibrated small bore passageway a distance which will depend upon the pressure of the fluid. The movement of the fluid will compress the air in the passageway and chamber until the pressure of the air equals the pressure of the fluid. The small bore passageway is empirically calibrated in terms of fluid pressure. Where used with human subjects, the device may be discarded after one use, since it can be made for a few pennies. In the case of apparatus used with animal subjects, the structure may be adapted for ready rinsing and re-use.

In FIG. 1, a pressure measuring device 10 is shown which is constructed in accordance with the invention. In this view the device 10 is shown being used to ascertain the venous blood pressure of a human subject, and the puncturing member 12 has been inserted into a vein in the ante-cubital portion of the subject's arm 14. The blood moves into the hollow bore of the puncturing member 12, into the capillary passageway 16 provided in the device, and the extent of entry into the latter passageway will determine the pressure. In this case, the blood has moved to the point designated 18 and the pressure is read directly on the scale 20 which may be calibrated in any suitable units.

The device 10 is shown in a somewhat larger scale in FIGS. 2 and 3 in order to emphasize the details thereof. In the particular structure the device is formed as a block 22 of some transparent plastic or synthetic resin suitably molded or pressed or otherwise fabricated, having a hypodermic needle as the puncturing member 12. The shape of the block member 22 is of no consequence, although here shown as elongate and rectangular in cross section. The puncturing member 12 has a hub or sleeve 24 which connects with the block member 22 in any suitable manner, such as for example, by molding the same or a part thereof into the block member. A separable union or screw-threaded connection may alternatively be provided. The hollow bore of the member 12 connects with the fine passageway 16 as previously explained, and this passageway 16 leads to a closed chamber 26 which may be termed a compression chamber. As the fluid enters the capillary passageway 16, it will commence to compress the air entrapped in the chamber 26 and will continue to compress it until the pressure of the air and that of the fluid are equal, at which point the fluid will stop its movement.

The device 10 may be formed in any of a number of different ways. One practical structure is illustrated in FIG. 3 in which the block member 22 is molded of opposed halves 22A and 22B having the half grooves forming the capillary passageway 16 and the chamber 26 provided therein so that the halves are cemented or welded together to complete the article. The indicia or scale 20 conveniently may be engraved, impressed or applied during the assembly process. Otherwise, the scale may be applied on the exterior by engraving, decalcomanias and the like.

The scale 20 is calibrated in accordance with the geometry of the passageway 16 and chamber 26, considering the volume of the bore in the connecting conduits as well. The relationship between the volume of the compression chamber and capillary passageway 16 will be determined by the requirements of the device. Different fluids will exert different ranges of pressures, and the subject matter will also influence this. For human subjects and the measurement of blood pressure, the compression chamber will usually be greater in volume than the volume of the capillary passageway.

The scale will in most fields of use be non-linear for a uniform diameter of the capillary passageway, but the capillary passageway diameter may be varied for achieving a linear scale if desired. Other compensating structural features can be used, but for most applications the device can be left as simple as appears in the drawing. Compensation for changes in the temperature of the entrapped air could also be worked into a suitable device for extreme accuracy.

The bore of the capillary passageway 16 can be varied in cross sectional area along its length through the provision of different stages of diameter so that the device will have different sensitivities at different pressure ranges.

In FIG. 4 a modified form of the invention is illustrated which results in a simplified apparatus utilizing parts which are commercially available or which are more readily fabricated than those parts of a device requiring the construction of molds and the like. The puncturing member 12 is again in the form of a conventional hypodermic needle, here shown engaged within a vein or other blood vessel 28. The hub or sleeve 24 of the needle 12 is engaged upon a transparent capillary tube 30 by means of a suitable fitting or union 32. This may be a cement, screw, force-fit or a telescopic connection, it being immaterial which. The capillary tube 30 is usually of glass but may be formed of plastic or other resin, and has a scale 34 marked or otherwise applied along the length thereof which will include the range of pressures to be measured. There may be a magnifying section similar to those of clinical thermometers if desired. The opposite end has a fitting 36 which connects with a section of flexible tubing 38 that forms the compression chamber in its interior. The section of flexible tubing is closed off opposite the connected end by means of a suitable plug 40.

The device of FIG. 4 is capable of being made in parts and assembled by the user. For example, different lengths of tubing 38 may be provided to vary the range of pressures measurable by the device.

In any of the structures of the invention the device is so simple in construction and economical to manufacture that it can be pre-sterilized and sold in a sealed container to be discarded after one use. For multiple uses, as for example, when working with animals, a structure such as that of FIG. 4 is convenient, since the plug 40 can be removed to enable the flushing of the device from the rear end of the compression chamber.

The relationship between the volume of the compression chamber and the capillary passageway (which may be considered the measuring passageway) is a matter of design, depending upon many factors such as the sensitivity desired, the length and diameter of the capillary passageway, the ranges of pressures encountered, the type of fluid and subjects used, etc. In a structure similar to that of FIG. 4 which was built and tested, the volume of the capillary passageway was approximately 5% to 7% of the volume of the compression chamber. A one millimeter capillary tube about four inches long provided a suitable measuring passageway in a one inch hypodermic needle of 18 or 20 gauge connected to an eight to ten inch length of plastic tubing having an inside diameter of 3 millimeters. For usual pressures encountered in the human vascular system, about ⅛ of an atmosphere, this device enables accurate determination of pressure to be made.

Almost any range of pressures encountered in fluid pressure measurements and any sensitivities desired can readily be built into a device constructed according to the invention, with all of the advantages inherent therein. This emphasizes that considerable variation in the details can be made without in any way departing from the spirit or scope of the invention as defined in the appended claims.

What it is desired to secure by Letters Patent is:

1. A fluid measuring device for intravenous use comprising a vessel-puncturing member having a hollow bore, a member connected with said bore and having a closed end passageway therein, the forward end of the passageway being of capillary dimensions and making connection with said bore whereby fluid passing through said member will enter said forward end of said passageway and pass thereinto a distance depending upon the compression of air trapped in said passageway, the forward end of said passageway being substantially smaller in volume than the remainder of said passageway.

2. A device as claimed in claim 1 in which said member is transparent at least in the vicinity of said forward end whereby to enable viewing of the fluid entering said passageway.

3. A device as claimed in claim 1 in which the forward end of said passageway is provided with transparent walls to enable viewing thereof and a scale is arranged alongside said forward end and calibrated in terms of pressure.

4. A fluid measuring device which comprises a hypodermic needle and a capillary tube connected to the needle and having a compression chamber communicating directly with the capillary tube, said chamber being substantially larger in volume than said tube and having a closed, dimensionally stable end spaced from the tube a distance corresponding to the length of the chamber, said tube having a scale for measuring the length of the tube traversed by fluid introduced into the tube from said needle, said scale being calibrated in units of fluid pressure indicative of a condition of pressure equilibrium between the fluid in the tube and the air compressed in said chamber by the fluid entering the tube.

5. A fluid pressure measuring arrangement comprising a dimensionally stable capillary tube having a closed end and in which fluid is arranged to flow under pressure towards said closed end whereby air originally under atmospheric pressure and entrapped between said fluid and closed end is compressed for terminating the flow of said fluid at a location in said tube dependent on the pressure of said fluid, said tube having a portion adjacent said closed end of larger cross-sectional area than the remainder of said tube, the cross-sectional area of said portion being related to the cross-sectional of said remainder of said tube so as to permit different bodies of fluid under different pressures to enter said remainder to respective different locations along the path thereof.

6. A manometric device for measuring fluid pressure comprising means providing an elongate hollow bore measuring passageway of generally capillary dimensions in cross section, means providing a dimensionally stable closed end compression chamber connected to one end of said measuring passageway and having a volume substantially greater than that of said passageway, and a hollow member connected to the other end of said measuring passageway and adapted to couple said measuring passageway to a direct source of fluid, the pressure of which it is desired to measure.

7. A device as claimed in claim 6 in which said first mentioned means is transparent and a scale is provided alongside said measuring passageway calibrated in pressure.

8. A device as claimed in claim 6 in which the said hollow bore has stages of varying cross sectional area.

References Cited in the file of this patent
UNITED STATES PATENTS

| | | |
|---|---|---|
| 2,625,153 | Baum | Jan. 13, 1953 |
| 2,866,453 | Jewett | Dec. 30, 1958 |

OTHER REFERENCES

Decamp et al. article, Surgery, volume 29, No. 1, pp. 46, 47. (Copy in Division 55.)